US012637620B2

(12) United States Patent
Shi et al.

(10) Patent No.: US 12,637,620 B2
(45) Date of Patent: May 26, 2026

(54) METHOD FOR PREPARING COATED MOFs BY SELF-ASSEMBLY OF INTUMESCENT FLAME RETARDANT

(71) Applicant: China Academy of Safety Science and Technology, Beijing (CN)

(72) Inventors: Congling Shi, Beijing (CN); Xiaodong Qian, Beijing (CN); Jingyun Jing, Beijing (CN); Honglei Che, Beijing (CN); Mei Wan, Beijing (CN)

(73) Assignee: China Academy of Safety Science and Technology, Beijing (CN)

( * ) Notice: Subject to any disclaimer, the term of this patent is extended or adjusted under 35 U.S.C. 154(b) by 650 days.

(21) Appl. No.: 18/077,250

(22) Filed: Dec. 8, 2022

(65) Prior Publication Data

US 2023/0174866 A1 Jun. 8, 2023

(30) Foreign Application Priority Data

Dec. 8, 2021 (CN) .......................... 202111493593.6

(51) Int. Cl.
| | |
|---|---|
| *C08K 5/56* | (2006.01) |
| *C08B 31/00* | (2006.01) |
| *C08B 37/08* | (2006.01) |
| *C08L 23/12* | (2006.01) |
| *C08L 63/00* | (2006.01) |
| *C08L 77/02* | (2006.01) |
| *C09K 21/10* | (2006.01) |
| *C09K 21/12* | (2006.01) |
| *C09K 21/14* | (2006.01) |

(52) U.S. Cl.
CPC .............. *C09K 21/14* (2013.01); *C08B 31/00* (2013.01); *C08B 37/003* (2013.01); *C08K 5/56* (2013.01); *C08L 23/12* (2013.01); *C08L 63/00* (2013.01); *C08L 77/02* (2013.01); *C09K 21/10* (2013.01); *C09K 21/12* (2013.01); *C08L 2201/02* (2013.01)

(58) Field of Classification Search
CPC ....... C08K 5/56; C08L 2201/02; C09K 21/10; C09K 21/12
USPC .......................................................... 523/179
See application file for complete search history.

(56) References Cited

FOREIGN PATENT DOCUMENTS

| CN | 112430351 A | * | 3/2021 | .............. C01G 23/08 |
|---|---|---|---|---|
| CN | 113045762 A | * | 6/2021 | ........... C08G 83/008 |

OTHER PUBLICATIONS

Wang Jing, et al., Application of metal organic frameworks (MOFs) in flame retardant polymer materials, Chemical Industrial New Materials, pp. 249-252, vol. 48 No. 10.

* cited by examiner

*Primary Examiner* — Ruiyun Zhang
(74) *Attorney, Agent, or Firm* — Bayramoglu Law Offices LLC

(57) ABSTRACT

A method for preparing an MOFs flame retardant modified by layer-by-layer self-assembly of an intumescent flame retardant is provided. The method mainly includes the steps of preparing MOFs, a positive electrolyte solution, and a negative electrolyte solution; dispersing the MOFs in the negative electrolyte solution; dispersing an obtained mixture in the positive electrolyte solution; obtaining a first double-molecule self-assembled layer on surfaces of the MOFs; and repeating the above operations for several times to obtain an MOFs flame retardant modified by intumescent self-assembled layers. The modified MOFs flame retardant of the present disclosure has excellent flame retardancy, flame retardant synergism, and dispersibility, and the defects of poor dispersibility and low flame retardant efficiency of MOFs flame retardants are overcome. A great application prospect is achieved.

9 Claims, No Drawings

METHOD FOR PREPARING COATED MOFs BY SELF-ASSEMBLY OF INTUMESCENT FLAME RETARDANT

CROSS REFERENCE TO THE RELATED APPLICATIONS

This application is based upon and claims priority to Chinese Patent Application No. 202111493593.6, filed on Dec. 8, 2021, the entire contents of which are incorporated herein by reference.

TECHNICAL FIELD

The present disclosure relates to the technical field of new materials, and specifically relates to a novel method for preparing coated MOFs by self-assembly of an intumescent flame retardant.

BACKGROUND

As environment-friendly flame retardant with high efficiency and low toxicity, the intumescent flame retardant (IFR) mainly consists of nitrogen and phosphorus, and does not contain halogen or use antimony oxide as a synergist. Due to foaming and expansion during heating, the flame retardant is called intumescent flame retardant. The flame retardant has synergistic flame retardant effects. When plastic containing the intumescent flame retardant is burning, a carboniferous foam layer is formed on the surface, the effects of heat insulation, oxygen insulation, smoke suppression, and drip prevention are achieved, and excellent flame retardancy is achieved. Meanwhile, non-corrosive gases with low smoke and low toxicity are produced in a burning process of a flame retardant material, conforming to the direction of research and development of flame retardants in the future.

Organic-inorganic hybrid materials can maintain good compatibility with a polymer matrix, and have high thermal stability and structural adjustability. Thus, the organic-inorganic hybrid materials are usually used to improve the flame retardancy and mechanical properties of polymers. Metal-organic frameworks (MOFs) are obtained by complexing organic ligands and inorganic components (such as metal ions or clusters), and are a type of the organic-inorganic hybrid materials. Relatively few researches have been conducted on the MOFs and derivatives thereof for improving the thermal stability and flame retardancy of polymers. Since structures are a basis of properties of the MOFs, the key to the preparation of high-performance polymer/MOFs composite materials is to prepare MOFs (or derivatives thereof) containing flame retardant units and having excellent thermal stability. Therefore, the development of the MOFs (or derivatives thereof) with the above advantages is extremely important to improve the flame retardancy of the composite materials.

The layer-by-layer self-assembly technology is a technology for obtaining a multilayer self-assembly system based on electrostatic adsorption. The technology is a method for layer-by-layer alternate deposition on the surface of a charged matrix material, and includes the process that multiple layers can be spontaneously associated to form a molecular aggregate with a complete structure and stable properties with the interaction between molecules of each layer in an assembled layer as a driving force. At present, the technology has been widely used in the research of modification of surfaces of materials. The technology also has the following advantages. (1) The layer-by-layer self-assembly technology mainly includes functional modification on the surface of a material, so that little influence is caused to physical properties of the material. (2) An assembly process is simple. In a preparation process, a charged matrix only needs to be soaked alternately in two polymer electrolyte solutions with opposite charges, and the whole self-assembly processes can be carried out automatically. (3) The assembly process has controllability. In the preparation process, the composition, thickness and the like of the assembled layer can be precisely adjusted on the nanoscale by changing assembly components or conditions (such as concentration and pH value of polymer electrolytes). In recent years, the layer-by-layer self-assembly technology has been developed and used in flame retardant modified polymer materials, and has become one of hot development directions in the flame retardant field.

SUMMARY

The present disclosure provides a method for preparing MOFs modified by intumescent self-assembled layers, and is specifically realized by using the following technical means.

A method for preparing MOFs modified by intumescent self-assembled layers includes the following steps:

step 1, preparing MOFs;

step 2, preparing a positive electrolyte solution and a negative electrolyte solution separately, where preferably, a positive electrolyte in the positive electrolyte solution includes one or more of chitosan, a phosphonitrile compound, and a phosphorus oxychloride compound;

preferably, a negative electrolyte in the negative electrolyte solution includes one or more of a phosphorus-containing chitin or phosphorus-containing chitosan derivative, a starch derivative, and a sodium carboxymethyl cellulose derivative;

and further preferably, the positive electrolyte solution has a mass concentration of 0.1 wt %-8 wt % (further preferably 2 wt %-8 wt %) and a pH value of 2-9, and the negative electrolyte solution has a mass concentration of 0.1 wt %-8 wt % (further preferably 1 wt %-8 wt %) and a pH value of 5-12;

step 3, dispersing the MOFs obtained in step 1 in the positive electrolyte solution obtained in step 2, conducting stirring for 10 minutes-20 minutes, and then conducting suction filtration and washing to obtain a first matrix material;

step 4, dispersing the first matrix material obtained in step 3 in the negative electrolyte solution obtained in step 2, conducting stirring for 5 minutes-10 minutes, followed by suction filtration and washing to obtain a second matrix material, and then obtaining a first double-molecule self-assembled layer on surfaces of the MOFs;

step 5, repeating step 3 and step 4 for 5-20 times in sequence to obtain an MOFs flame retardant modified by intumescent self-assembled layers. Since a coating material includes elements such as nitrogen and phosphorus, the MOFs flame retardant modified by intumescent self-assembled layers can be obtained.

Preferably, in step 1, a method for preparing the MOFs specifically includes: dissolving a metal salt compound and 2-aminoterephthalic acid in N,N-dimethylformamide for ultrasonic and uniform mixing; transferring an obtained mixed solution into a reactor with a polytetrafluoroethylene lining, and subjecting the mixed solution to a reaction at a temperature of 80° C.-250° C. for 24 hours-72 hours; conducting cooling, filtration, and washing with N,N-dimethylformamide for more than 1 time; conducting dispersion in methanol for 1 day-5 days; then conducting centrifugation and vacuum drying; and at last, conducting activation at 150° C.-180° C. for 2 hours-15 hours to obtain the MOFs.

Preferably, in step 2, a method for preparing the negative electrolyte solution specifically includes: putting a negative electrolyte matrix and a solvent into a container for uniform stirring to obtain a mixed solution, where a ratio of the negative electrolyte matrix to the solvent is 1 g:(10-15) ml; putting the container in an ice bath at 6° C.-13° C., adding phosphorus pentoxide that is 3-6 times a mass of a negative electrolyte into the mixed solution under the protection of an inert gas, and subjecting an obtained mixture to a reaction under the condition of the ice bath for 4 hours-6 hours to obtain a paste; washing a product, and repeating the washing operation for more than 1 time; drying an obtained solid substance in a vacuum oven at 40° C.-60° C. for 6 hours-18 hours; and mixing a negative electrolyte of the obtained solid with deionized water to obtain the negative electrolyte solution.

Preferably, the negative electrolyte matrix is chitin; the solvent is methanesulfonic acid; the inert gas is nitrogen; and the product washing specifically includes washing the product with ethyl ether, methanol, and acetone in sequence.

Preferably, in step 2, a method for preparing the positive electrolyte solution specifically includes: separately adding a positive electrolyte matrix and an alkaline substance into a heterocyclic organic compound, where a ratio of the heterocyclic organic compound to the positive electrolyte matrix to the alkaline substance is (750-850) ml:(30-38) g:(16-36) g;

subjecting an obtained mixture to a reaction at a temperature of 50° C.-70° C. for 8 hours-13 hours; removing the heterocyclic organic compound by distillation under reduced pressure to obtain a positive electrolyte; and mixing the obtained positive electrolyte with deionized water to obtain the positive electrolyte solution.

Preferably, the heterocyclic organic compound is tetrahydrofuran, the positive electrolyte matrix is hexachlorocyclotriphosphazene, and the alkaline substance is ethylenediamine.

Preferably, in step 2, a method for preparing the negative electrolyte solution specifically includes: sequentially adding a negative electrolyte matrix, an amide, and an inorganic binary acid into deionized water to obtain a mixed solution, where a ratio of the negative electrolyte matrix to the amide to the inorganic binary acid to the deionized water is (1.2-1.8) g:(0.6-1.2) g:(1.2-1.8) g:(25-35) ml; adjusting the pH of the mixed solution to 4.5-5.5 with an acid, and subjecting the mixed solution to a reaction at 55° C.-65° C. for 10 hours-14 hours under the protection of an inert gas; after the reaction is completed, cooling the mixed solution to room temperature, and conducting suction filtration to obtain a reactant; washing the reactant for more than 1 time to obtain a negative electrolyte; and mixing the obtained negative electrolyte with deionized water to obtain the negative electrolyte solution.

Preferably, the negative electrolyte matrix is oxidized starch; the amine is ethanolamine; the inorganic binary acid is phosphorous acid, and the inert gas is nitrogen; and the acid is acetic acid, and the reactant washing includes washing with ethanol.

Preferably, in step 2, a method for preparing the negative electrolyte solution specifically includes: sequentially adding a negative electrolyte matrix and an inorganic salt into deionized water to obtain a mixture, where a ratio of the negative electrolyte matrix to the inorganic salt to the deionized water is (0.8-1.3) g:(1.6-2.6) g:(45-55) ml; stirring the mixture at 35° C.-45° C. for uniform dispersion to obtain an emulsion; adjusting the pH of the emulsion to 8.5-9.3 with an alkaline solution, and conducting continuous mixing for 2.5 hours-3.5 hours to stop a reaction; adjusting the pH of a mixture obtained after the reaction to 6.8-7.2 with an acidic solution, and conducting washing and suction filtration to obtain a solid; drying the solid in an oven at 48° C.-53° C. for 10 hours-15 hours to obtain a negative electrolyte (or to obtain a negative electrolyte matrix containing an aldehyde group; sequentially adding the negative electrolyte matrix containing an aldehyde group, an amide, and an inorganic binary acid into deionized water to obtain a mixed solution, where a ratio of the negative electrolyte matrix containing an aldehyde group to the amide to the inorganic binary acid to the deionized water is (1.2-1.8) g:(0.6-1.2) g:(1.2-1.8) g:(25-35) ml; adjusting the pH of the mixed solution to 4.5-5.5 with an acid, and subjecting the mixed solution to a reaction at 55° C.-65° C. for 10 hours-14 hours under the protection of an inert gas; after the reaction is completed, cooling the mixed solution to room temperature, and conducting suction filtration to obtain a reactant; washing the reactant for more than 1 time to obtain a negative electrolyte; and mixing the obtained negative electrolyte with deionized water to obtain the negative electrolyte solution. The negative electrolyte matrix is oxidized starch containing an aldehyde group; the amine is ethanolamine; the inorganic binary acid is phosphorous acid, and the inert gas is nitrogen; and the acid is acetic acid, and the reactant washing includes washing with ethanol); and mixing the obtained negative electrolyte with deionized water to obtain the negative electrolyte solution.

Preferably, the negative electrolyte matrix is starch; the inorganic salt is sodium hypochlorite, the alkaline solution is a sodium hydroxide aqueous solution, and the acidic solution is a hydrochloric acid solution.

Preferably, in step 2, a method for preparing the positive electrolyte solution specifically includes: dissolving a positive electrolyte matrix in a heterocyclic organic compound to obtain a first solution; dropping an alkaline substance into the first solution; subjecting an obtained mixture to a reaction at 16° C.-23° C. for 10 hours-15 hours under the protection of an inert gas; removing the alkaline substance by distillation under reduced pressure to obtain a positive electrolyte; and then mixing the obtained positive electrolyte with deionized water to obtain the positive electrolyte solution.

Preferably, the heterocyclic organic compound is tetrahydrofuran, the positive electrolyte matrix is dichlorophenylphosphine, the alkaline substance is ethylenediamine, and the inert gas is nitrogen.

Preferably, the phosphonitrile compound is a phosphonitrile compound containing amino in the structure.

Preferably, the phosphorus oxychloride compound is a phosphorus oxychloride compound containing amino in the structure.

Preferably, the phosphorus-containing chitin derivative structurally includes phosphatized chitin or phosphatized chitosan.

Preferably, the starch derivative structurally includes phosphatized starch.

The present disclosure has the following technical effects.

According to the method for preparing MOFs modified by intumescent self-assembled layers in the present disclosure, double-molecule self-assembled layers consisting of a positive electrolyte and a negative electrolyte are modified on surfaces of the MOFs by layer-by-layer construction. The double-molecule self-assembled layers are designed into an intumescent flame retardant system with an excellent flame retardant effect. Moreover, due to the layer-by-layer construction, the content and component of the double-molecule self-assembled layers can be precisely adjusted, so that the advantage of controllability of a modification effect is achieved. Through specific limitations of each step, especially specific limitations of specific parameters in each step, an optimum combination of the flame retardant effect and the affinity of a matrix is achieved. In addition, the double-molecule self-assembled layers also contain an organic component, so that the affinity of the MOFs and an organic polymer matrix can be improved. The MOFs modified by the double-molecule self-assembled layers can have both an excellent and controllable flame retardant effect and the affinity of a matrix, and the defects of poor dispersibility and low flame retardant efficiency of single MOFs flame retardants are overcome.

Through self-assembly of the MOFs, interface properties on surfaces of the MOFs are adjusted, so that the MOFs flame retardant has excellent flame retardancy, flame retardant synergism, and dispersibility, and the defects of poor dispersibility and low flame retardant efficiency of MOFs flame retardants are overcome.

DETAILED DESCRIPTION OF THE EMBODIMENTS

Example 1

A method for preparing MOFs modified by intumescent self-assembled layers mainly includes the following steps.

S1. Preparation of MOFs: 1.25 g of $ZrCl_4$ and 1.34 g of 2-aminoterephthalic acid ($NH_2$-BDC) were dissolved in 75 ml of DMF (N,N-dimethylformamide) for ultrasonic and uniform mixing. An obtained mixed solution was transferred into a reactor with a polytetrafluoroethylene lining, and continuously subjected to a reaction at a temperature of 120° C. for 36 hours. The mixed solution was washed with DMF for three times, and then dispersed in methanol for 1 day-2 days to obtain a yellow suspension. At last, the UiO-66-$NH_2$ suspension was centrifuged, dried under vacuum, and activated at 170° C. for several hours to obtain UiO-66-$NH_2$(Zr).

S2. Preparation of a positive electrolyte solution and a negative electrolyte solution separately: 10 g of chitin and 120 mL of methanesulfonic acid were weighed, and put into a container for uniform stirring to obtain a mixed solution. The container was put in an ice bath at 10° C., 50 g of phosphorus pentoxide was added into the mixed solution under the protection of nitrogen, and an obtained mixture was subjected to a reaction under the condition of the ice bath for 5 hours to obtain a paste. A product was washed with ethyl ether, methanol, and acetone in sequence, and the washing operation was repeated for 2 times. An obtained solid substance was dried in a vacuum oven at 50° C. for 10 hours to obtain a phosphorus-containing chitin derivative with an orthophosphate structure. The obtained phosphorus-containing chitin derivative was prepared into a negative electrolyte solution with a mass concentration of 2% and a pH value of 7. S22. Preparation of a positive electrolyte solution: 34 g of hexachlorocyclotriphosphazene and 18 g of ethylenediamine were separately added into 800 ml of tetrahydrofuran. An obtained mixture was subjected to a reaction at a temperature of 60° C. for 10 hours. The tetrahydrofuran was removed by distillation under reduced pressure to obtain a phosphonitrile compound. The obtained phosphonitrile compound was prepared into a positive electrolyte solution with a mass concentration of 1% and a pH value of 6.

S3. The MOFs obtained in S1 were dispersed in the positive electrolyte solution, and stirred for 10 minutes. After suction filtration was conducted, a first solid substance was collected, and the first solid substance was washed with deionized water for 3 times to obtain a first matrix material. The first matrix material was dispersed in the negative electrolyte solution, and stirred for 10 minutes. After suction filtration was conducted, a second solid substance was collected, and the second solid substance was washed with deionized water for 3 times to obtain a second matrix material. Then, a first double-molecule self-assembled layer on surfaces of the MOFs was obtained, and alternately treated in the positive electrolyte solution and the negative electrolyte solution for 5 times to obtain MOFs modified by 5 intumescent self-assembled layers.

200 g of a hybrid nanocomposite flame retardant prepared above and 800 g of PA6 were uniformly mixed. After uniform mixing was completed, an obtained mixture was added into a twin-screw extruder for extrusion granulation at a unit temperature of 220° C.-240° C., a die head temperature of 230° C., and a screw rotation speed of 240 rpm. Then, drying and cooling were conducted, and a flame retardant PA6 granule was obtained. According to a UL94 vertical flame test, a sample reached a V0 level. According to an oxygen index test by a limit oxygen index tester, the sample had an oxygen index of 32.5. From measurement of the UL-94 and the oxygen index, it can be seen that the flame retardant has a good flame retardant effect on the PA6.

Comparative Example 1

200 g of unmodified MOFs and 800 g of PA6 were uniformly mixed. After uniform mixing was completed, an obtained mixture was added into a twin-screw extruder for extrusion granulation at a unit temperature of 220° C.-240° C., a die head temperature of 230° C., and a screw rotation speed of 240 rpm. Then, drying and cooling were conducted, and a flame retardant PA6 granule was obtained. According to a UL94 vertical flame test, a sample reached a V1 level. According to an oxygen index test by a limit oxygen index tester, the sample had an oxygen index of 29. From measurement of the UL-94 and the oxygen index, it can be seen that the modified MOFs in Example 1 have a more obvious flame retardant effect on the PA6.

Example 2

A method for preparing MOFs modified by intumescent self-assembled layers mainly includes the following steps.

S1. Preparation of MOFs: 1.35 g of ferric trichloride hexahydrate ($FeCl_3 \cdot 6H_2O$) and 0.45 g of $NH_2$-BDC were dissolved in 30 ml of DMF for ultrasonic and uniform mixing. An obtained mixed solution was transferred into a reactor with a polytetrafluoroethylene lining, and subjected to a reaction at a temperature of 110° C. for 24 hours. After the reaction was completed, the mixed solution was naturally cooled to room temperature, filtered, washed with DMF and methanol for several times, and finally dried under vacuum to obtain a brown powder $NH_2$-MIL-101(Fe).

S2. Preparation of a positive electrolyte solution and a negative electrolyte solution separately: Through a Mannich reaction, 1.6 g of oxidized starch, 1 g of ethanolamine, and 1.6 g of phosphorous acid were sequentially added into 30 ml of deionized water to obtain a mixed solution. After the pH of the mixed solution was adjusted to 5 with acetic acid, the mixed solution was subjected to a reaction at 60° C. for 12 hours under the protection of nitrogen. After the reaction was completed, the mixed solution was cooled to room temperature, and subjected to suction filtration to obtain a reactant. The reactant was washed with ethanol for 3 times to obtain a starch derivative with a phosphite structure. The obtained starch derivative was prepared into a negative electrolyte solution with a mass concentration of 0.5% and a pH value of 7. S22. Preparation of a positive electrolyte solution: The positive electrolyte solution in the example was prepared from chitosan, and had a mass concentration of 1% and a pH value of 4.

S3. The MOFs obtained in S1 were dispersed in the positive electrolyte solution, and stirred for 10 minutes. After suction filtration was conducted, a first solid substance was collected, and the first solid substance was washed with deionized water for 3 times to obtain a first matrix material. The first matrix material was dispersed in the negative electrolyte solution, and stirred for 10 minutes. After suction filtration was conducted, a second solid substance was collected, and the second solid substance was washed with deionized water for 3 times to obtain a second matrix material. Then, a first double-molecule self-assembled layer on surfaces of the MOFs was obtained, and alternately treated in the positive electrolyte solution and the negative electrolyte solution for 5 times to obtain MOFs modified by 5 intumescent self-assembled layers.

230 g of a hybrid nanocomposite flame retardant prepared above and 770 g of PP were uniformly mixed. After uniform mixing was completed, an obtained mixture was added into a twin-screw extruder for extrusion granulation at a unit temperature of 180° C.-200° C., a die head temperature of 185° C., and a screw rotation speed of 230 rpm. Then, drying and cooling were conducted, and a flame retardant PP granule was obtained. According to a UL94 vertical flame test, a sample reached a V0 level. According to an oxygen index test by a limit oxygen index tester, the sample had an oxygen index of 32.5. From measurement of the UL-94 and the oxygen index, it can be seen that the flame retardant has a good flame retardant effect on the PP.

Example 3

A method for preparing MOFs modified by intumescent self-assembled layers mainly includes the following steps.

S1. Preparation of MOFs: 1.02 g of $AlCl_3 \cdot 6H_2O$ and 1.12 g of $NH_2$-BDC were dissolved in 60 ml of DMF for ultrasonic and uniform mixing. An obtained mixed solution was transferred into a reactor with a polytetrafluoroethylene lining, and subjected to a reaction at a temperature of 130° C. for 72 hours. The mixed solution was naturally cooled to room temperature, and centrifuged. A product was separately washed with DMF and methanol for 3 times, and finally dried in a vacuum oven at 80° C. to obtain $NH_2$-MIL-101(Al).

S2. Preparation of a positive electrolyte solution and a negative electrolyte solution separately. A negative electrolyte solution: (1) 1 g of starch and 2 g of sodium hypochlorite were sequentially added into 50 ml of deionized water, and uniformly stirred for dispersion at 40° C. to obtain a starch emulsion. After the pH of the starch emulsion was adjusted to 9 with a sodium hydroxide aqueous solution, the starch emulsion was subjected to a reaction for 3 hours. After the reaction was stopped, the pH of the starch emulsion obtained after the reaction was adjusted to 7 with a hydrochloric acid solution, and washing and suction filtration were conducted to obtain a solid. The solid was dried in an oven at 50° C. for 12 hours to obtain oxidized starch containing an aldehyde group. Through a Mannich reaction, 1.6 g of the oxidized starch containing an aldehyde group prepared above, 1 g of ethanolamine, and 1.6 g of phosphorous acid were sequentially added into 30 ml of deionized water to obtain a mixed solution. After the pH of the mixed solution was adjusted to 5 with acetic acid, the mixed solution was subjected to a reaction at 60° C. for 12 hours under the protection of nitrogen. After the reaction was completed, the mixed solution was cooled to room temperature, and subjected to suction filtration to obtain a reactant. The reactant was washed with ethanol for 3 times to obtain a starch derivative with a phosphite structure. The obtained starch derivative was prepared into a negative electrolyte solution with a mass concentration of 0.5% and a pH value of 7. S22. Preparation of a positive electrolyte solution: 0.1 mol of dichlorophenylphosphine was dissolved in 200 ml of tetrahydrofuran to obtain a first solution. 0.2 mol of ethylenediamine was dropped into the first solution for a reaction at 20° C. for 12 hours under the protection of nitrogen. The tetrahydrofuran was removed by distillation under reduced pressure to obtain a phosphorus oxychloride compound. The phosphorus oxychloride compound was prepared into a positive electrolyte solution with a mass concentration of 0.4% and a pH value of 7.

S3. The MOFs obtained in S1 were dispersed in the positive electrolyte solution, and stirred for 10 minutes. After suction filtration was conducted, a first solid substance was collected, and the first solid substance was washed with deionized water for 3 times to obtain a first matrix material. The first matrix material was dispersed in the negative electrolyte solution, and stirred for 10 minutes. After suction filtration was conducted, a second solid substance was collected, and the second solid substance was washed with deionized water for 3 times to obtain a second matrix material. Then, a first double-molecule self-assembled layer on surfaces of the MOFs was obtained, and alternately treated in the positive electrolyte solution and the negative electrolyte solution for 5 times to obtain MOFs modified by 5 intumescent self-assembled layers.

4.0 g of a hybrid nanocomposite flame retardant prepared above and 40 g of epoxy resin were uniformly stirred at 60° C., and 8.7 g of 4,4-diaminodiphenylmethane was added to serve as a curing agent. After being poured into a die with a length of 8 cm, a width of 3 cm, and a thickness of 3 cm, a flame retardant resin liquid was heated to 100° C., subjected to heat preservation for 2 hours, heated to 150° C., subjected to heat preservation for 2 hours, and then cooled to room temperature. After demolding was conducted, a sample was obtained. According to a UL94 vertical flame test, the sample reached a V0 level. According to an oxygen index test by a limit oxygen index tester, the sample had an oxygen index of 32.0. From measurement of the UL-94 and the oxygen index, it can be seen that the hybrid nanocomposite flame retardant has a good flame retardant effect on the epoxy resin.

What is claimed is:

1. A method for preparing MOFs modified by intumescent self-assembled layers, comprising the following steps:

step 1, preparing the MOFs; wherein a method for preparing the MOFs comprises: dissolving a metal salt compound and 2-aminoterephthalic acid in N,N-dimethylformamide to obtain a mixed solution for an ultrasonic and uniform mixing; transferring the mixed solution into a reactor with a polytetrafluoroethylene lining, and subjecting the mixed solution to a first reaction at a temperature of 80° C.-250° C. for 24 hours-72 hours; conducting a cooling, a filtration, and a washing with the N,N-dimethylformamide for more than 1 time; conducting a dispersion in methanol for 1 day-5 days; then conducting a centrifugation and a vacuum drying; and at last, conducting an activation at 150° C.-180° C. for 2 hours-15 hours to obtain the MOFs;

step 2, preparing a positive electrolyte solution and a negative electrolyte solution separately, wherein a positive electrolyte in the positive electrolyte solution is one or more of a chitosan, a phosphonitrile compound, and a phosphorus oxychloride compound; a negative electrolyte in the negative electrolyte solution is one or more of a phosphorus-containing chitin derivative or a phosphorus-containing chitosan derivative, a starch derivative, and a sodium carboxymethyl cellulose derivative; the positive electrolyte solution has a mass concentration of 0.1 wt %-8 wt % and a pH value of 2-9, and the negative electrolyte solution has a mass concentration of 0.1 wt %-8 wt % and a pH value of 5-12;

step 3, dispersing the MOFs obtained in the step 1 in the positive electrolyte solution obtained in the step 2, conducting a stirring for 10 minutes-20 minutes, and then conducting a suction filtration and a washing to obtain a first matrix material;

step 4, dispersing the first matrix material obtained in the step 3 in the negative electrolyte solution obtained in the step 2, conducting a stirring for 5 minutes-10 minutes, followed by a suction filtration and a washing to obtain a second matrix material, and then obtaining a first double-molecule self-assembled layer on surfaces of the MOFs; and step 5, repeating the step 3 and the step 4 for 5-20 times in sequence to obtain an MOFs flame retardant modified by the intumescent self-assembled layers.

2. The method for preparing the MOFs modified by intumescent self-assembled layers according to claim 1, wherein in the step 2, a method for preparing the negative electrolyte solution comprises: putting a negative electrolyte matrix and a solvent into a container for a uniform stirring to obtain a mixed solution, wherein a ratio of the negative electrolyte matrix to the solvent is 1 g:(10-15) ml; putting the container in an ice bath at 6° C.-13° C., adding phosphorus pentoxide into the mixed solution under a protection of an inert gas to obtain a first mixture, the phosphorus pentoxide is 3-6 times a mass of the negative electrolyte, and subjecting the first mixture to a second reaction under the ice bath for 4 hours-6 hours to obtain a paste as a product; washing the product, and repeating the washing for more than 1 time to obtain a solid substance; drying the solid substance in a vacuum oven at 40° C.-60° C. for 6 hours-18 hours to obtain the negative electrolyte; and mixing the negative electrolyte with a deionized water to obtain the negative electrolyte solution.

3. The method for preparing the MOFs modified by the intumescent self-assembled layers according to claim 2, wherein the negative electrolyte matrix is a chitin; the solvent is methanesulfonic acid; the inert gas is nitrogen; and the washing comprises washing the product with ethyl ether, the methanol, and acetone in sequence.

4. The method for preparing the MOFs modified by the intumescent self-assembled layers according to claim 1, wherein in the step 2, a method for preparing the positive electrolyte solution comprises: separately adding a first positive electrolyte matrix and an alkaline substance into a heterocyclic organic compound to obtain a second mixture, wherein a ratio of the heterocyclic organic compound to the first positive electrolyte matrix to the alkaline substance is (750-850) ml:(30-38) g:(16-36) g; subjecting the second mixture to a third reaction at a temperature of 50° C.-70° C. for 8 hours-13 hours; removing the heterocyclic organic compound by a first distillation under a first reduced pressure to obtain the positive electrolyte; and mixing the positive electrolyte with a deionized water to obtain the positive electrolyte solution;

alternatively, in the step 2, a method for preparing the positive electrolyte solution comprises: dissolving a second positive electrolyte matrix in the heterocyclic organic compound to obtain a first solution; dropping the alkaline substance into the first solution to obtain a third mixture, wherein a ratio of the second positive electrolyte matrix to the heterocyclic organic compound to the alkaline substance is (0.08-0.12) mol:(180-220) ml: (0.18-0.23) mol; subjecting the third mixture to a fourth reaction at 16° C.-23° C. for 10 hours-15 hours under a protection of an inert gas; removing the alkaline substance by a second distillation under a second reduced pressure to obtain the positive electrolyte; and mixing the positive electrolyte with the deionized water to obtain the positive electrolyte solution.

5. The method for preparing the MOFs modified by the intumescent self-assembled layers according to claim 4, wherein the heterocyclic organic compound is tetrahydrofuran, the first positive electrolyte matrix is hexachlorocyclotriphosphazene, the second positive electrolyte matrix is dichlorophenylphosphine, the alkaline substance is ethylenediamine, and the inert gas is nitrogen.

6. The method for preparing the MOFs modified by the intumescent self-assembled layers according to claim 1, wherein in the step 2, a method for preparing the negative electrolyte solution comprises:

sequentially adding a negative electrolyte matrix, an amine, and an inorganic binary acid into a deionized water to obtain a mixed solution, wherein a ratio of the negative electrolyte matrix to the amine to the inorganic binary acid to the deionized water is (1.2-1.8) g:(0.6-1.2) g:(1.2-1.8) g:(25-35) ml; adjusting a pH of the mixed solution to 4.5-5.5 with an acid, and subjecting the mixed solution to a fifth reaction at 55° C.-65° C. for 10 hours-14 hours under a protection of an inert gas; after the fifth reaction is completed, cooling the mixed solution to a room temperature, and conducting a suction filtration to obtain a reactant; washing the reactant for more than 1 time to obtain the negative electrolyte; and mixing the negative electrolyte with the deionized water to obtain the negative electrolyte solution.

7. The method for preparing the MOFs modified by the intumescent self-assembled layers according to claim 6, wherein the negative electrolyte matrix is an oxidized starch; the amine is ethanolamine; the inorganic binary acid is phosphorous acid, and the inert gas is nitrogen; and the acid is acetic acid, and the washing the reactant comprises washing the reactant with ethanol.

8. The method for preparing the MOFs modified by the intumescent self-assembled layers according to claim 1, wherein In the step 2, a method for preparing the negative electrolyte solution comprises: sequentially adding a negative electrolyte matrix and an inorganic salt into a deionized water to obtain a first mixture, wherein a ratio of the negative electrolyte matrix to the inorganic salt to the deionized water is (0.8-1.3) g:(1.6-2.6) g:(45-55) ml; stirring the first mixture at 35° C.-45° C. for a uniform dispersion to obtain an emulsion; adjusting a pH of the emulsion to 8.5-9.3 with an alkaline solution, and conducting a continuous mixing for 2.5 hours-3.5 hours to stop a sixth reaction to obtain a second mixture; adjusting a pH of a second mixture to 6.8-7.2 with an acidic solution, and conducting a washing and a suction filtration to obtain a solid; drying the solid in an oven at 48° C.-53° C. for 10 hours-15 hours to obtain the negative electrolyte; and mixing the negative electrolyte with the deionized water to obtain the negative electrolyte solution.

9. The method for preparing the MOFs modified by the intumescent self-assembled layers according to claim 8, wherein the negative electrolyte matrix is starch; the inorganic salt is sodium hypochlorite, the alkaline solution is a sodium hydroxide aqueous solution, and the acidic solution is a hydrochloric acid solution.

* * * * *